United States Patent [19]
Soininen et al.

[11] Patent Number: 6,113,977
[45] Date of Patent: Sep. 5, 2000

[54] METHOD OF GROWING A ZNS:MN PHOSPHOR LAYER FOR USE IN THIN-FILM ELECTROLUMINESCENT COMPONENTS

[75] Inventors: Erkki Lauri Soininen; Gitte Härkönen; Marja Lahonen, all of Espoo; Runar Törnqvist, Kauniainen; Juha Viljanen, Espoo, all of Finland

[73] Assignee: Planar International Oy Ltd., Espoo, Finland

[21] Appl. No.: 08/927,523

[22] Filed: Sep. 11, 1997

[30] Foreign Application Priority Data

Sep. 11, 1996 [FI] Finland ..................................... 963587

[51] Int. Cl.⁷ ...................................................... B05D 5/06
[52] U.S. Cl. .................. 427/64; 427/255.32; 427/255.33
[58] Field of Search ........................ 117/88, 104; 427/64, 427/255.32, 66, 255.33

[56] References Cited

U.S. PATENT DOCUMENTS

| | | | |
|---|---|---|---|
| 4,058,430 | 11/1977 | Suntola et al. | 156/611 |
| 4,389,973 | 6/1983 | Suntola et al. | 118/725 |
| 4,442,136 | 4/1984 | Johnson | 427/64 |
| 5,624,705 | 4/1997 | Stutzmann et al. | 427/64 |
| 5,695,809 | 12/1997 | Chadha | 427/64 |

OTHER PUBLICATIONS

J. Hyvärinen et al., "Mass Spectrometry Study of ZnS Atomic Layer Epitaxy Process", Journal of Crystal Growth 86 (1988) pp. 695–699 (no mo.).

M. Tammenmaa et al., "Growth of ZnS Thin Films Using Zinc Acetate as Zinc Source and Manganese and Lanthanoid β–Diketonates as Activator Sources", First Symposium on Atomic Layer Epitaxy, pp. 18–21, VTT, Espoo, Finland, 1984 (no mo.).

A. Yoshikawa et al., "MBE–Like" AMD "CVD–Like" Atomic Layer Epitaxy of ZnSe in MOMBE System, Journal of Crystal Growth 101 (1990) pp. 86–90 (no mo.).

Y. Wu et al, "Atomic Layer Epitaxy of ZnS on GaAs Substrates by Metalorganic Molecular Beam Epitaxy", Japanese Journal of Applied Physics, vol. 29, No. 5, May, 1990, pp. L727–L730.

N. Shibata et al., "Monolayer Epitaxy of ZnSe on GaAs Substrates by Alternating Adsorption of Diethylzinc and Hydrogenselenide", Journal of Crystal Growth 101 (1990) pp. 91–95 (no mo.)

I. Bhat, "Atomic Layer Epitaxial Growth Studies of ZnSe Using Dimethylzinc and Hydrogen Selenide", Journal of Crystal Growth 138 (1994) pp. 127–130 (no mo.)

M. Migita et al., "The Preparation of ZnS:Mn Electroluminescent Layers by MOCVD Using New Manganese Sources", Journal of Crystal Growth 93 (1988) pp. 686–691 (no mo.).

*Primary Examiner*—Janyce Bell
*Attorney, Agent, or Firm*—McDermott, Will & Emery

[57] ABSTRACT

The invention relates to a method of growing a ZnS:Mn phosphor layer suitable for use in thin-film electroluminescent components. According to the method, the ZnS:Mn phosphor layer is grown on a substrate by means of the ALE method using volatile zinc, sulfur and manganese compounds as the precursors. According to the invention, an organozinc compound such as diethylzinc or dimethylzinc is used as precursor for zinc, hydrogen sulfide or an organosulfur compound is used as precursor for sulfur, and an organomanganese compound or organic manganese complex compound is used as precursor for manganese. The invention provides a display component with drive-voltage-symmetrical light emission and stable characteristics of luminance level and turn-on voltage.

20 Claims, 4 Drawing Sheets

METHOD OF GROWING A ZNS:MN PHOSPHOR LAYER FOR USE IN THIN-FILM ELECTROLUMINESCENT COMPONENTS

BACKGROUND OF THE INVENTION

1. Field of the Invention

The present invention relates to the manufacture of thin-film components. In particular, the present invention concerns a method for growing a ZnS:Mn phosphor layer for use in inorganic thin-film electroluminescent components, wherein the ZnS:Mn phosphor layer is grown on a substrate by means of the Atomic Layer Epitaxy method. According to the method, volatile (i.e., gaseous or vaporizable) zinc, sulfur and manganese compounds are used as precursors for preparing the layer to be deposited.

2. Description of Related Art

Flat electroluminescent displays are used in applications requiring a wide viewing angle, a wide temperature range and a rugged device structure. The most important electroluminescent phosphor material is manganese-doped zinc sulfide (ZnS:Mn) which is conventionally used in all monochrome electroluminescent displays emitting yellow light. Also polychrome electroluminescent displays emitting red and green are based on the same phosphor material, whereby the red and green colors are obtained by filtration from the emission spectrum of ZnS:Mn.

Thin-film electroluminescent (TFEL) layers of ZnS:Mn have been made in the art by means of different methods: evaporation, sputtering, metalorganic chemical vapor deposition (MOCVD) and atomic layer epitaxy (ALE). Of these methods, evaporation and ALE are used in the commercial manufacture of TFEL displays. In an industrial process, both the economic efficiency of the method and the performance of the electroluminescent ZnS:Mn thin film thus obtained are crucial.

Of gas-phase deposition methods, the most widely used are MOCVD and ALE. In the MOCVD method, the precursors are introduced simultaneously into the reactor. The film growth mechanism is principally based on the pyrolysis of the precursors on the substrate surface, whereby the mass flow rates of the precursors can be adjusted to essentially control the film growth rate. In the ALE method, the precursors are sequentially pulsed into the reactor. Herein, the growth mechanism is not based on pyrolysis, but instead, on exchange reactions on the substrate surface. Thus, a self-limiting growth rate is obtained, that is, the growth rate is independent from the mass flow rates of the precursors. Therefore, it is more difficult in the MOCVD method to achieve good uniformity of the deposited film, which explains why this method has not been used in the large-scale production of electroluminescent ZnS:Mn thin-film components. In contrast, the ALE method uses a clearly different approach, whereby thin films made by means of this process exhibit sufficiently uniform thicknesses and compositions for the commercial manufacture of electroluminescent displays.

Conventionally, the best electroluminescent ZnS:Mn thin films made using the ALE method have been prepared using zinc chloride, manganese chloride and hydrogen sulfide as precursors, whereby the substrate surface temperature has been in the range from 500 to 520° C. (cf. FI Patent Specification No. 86995). The same process is also used in the industrial production of electroluminescent displays. Herein, the substrate surface is alternately subjected to reactions with zinc chloride and hydrogen sulfide, whereby a molecular zinc chloride layer adsorbed on the surface reacts with the hydrogen sulfide forming zinc sulfide [J. Hyvärinen, M. Sonninen and R. Törnqvist:

Journal of Cryst. Growth, Vol. 86 (1988), p. 695].

Up to date, hundreds of thousands of thin-film electroluminescent ZnS:Mn displays have been successfully made using the ALE method using chlorides as precursors for depositing ZnS:Mn. However, this conventional technique involves a few evident disadvantages. An example of these is the asymmetric light emission of the electroluminescent ZnS:Mn structure. This phenomenon is elucidated in the appended FIG. 1a. As is evident from the diagram, one polarity of the pixel drive voltage produces higher light emission than the other polarity. In practice, this sets limitations to the use of frequency modulation in the generation of different gray levels on an electroluminescent display, because visible flicker of the emitted light will occur at low drive frequencies due to the asymmetric light emission.

Chiefly due to the low vapor pressure of manganese chloride, the chloride process presupposes a substrate temperature of at least 500° C. This temperature is already very close to the softening point of soda lime glass. Because a soda lime glass substrate is favored on economical grounds, the process temperature must be kept close to 500° C. (in the range 500–520° C.), although layers of improved performance could be obtained at a higher temperature. Because soda lime glass is subject to softening already in the temperature range conventionally used, this phenomenon gives rise to extra costs in the manufacturing process of EL displays.

For the handling of both zinc and manganese chloride, the ALE deposition equipment must be provided with sublimation sources which are both clumsy to handle and difficult to control. Furthermore, as zinc chloride forming the matrix of the thin-film compound is consumed at a higher rate of the two precursors, zinc chloride is obviously the one causing more problems.

SUMMARY OF INVENTION

It is an object of the present invention to overcome the drawbacks of the above-described technique and to provide an entirely novel approach to the growth of manganese-doped zinc sulfide phosphor layers for use in electroluminescent display components. It is a particular object of the invention to improve the performance of electroluminescent ZnS:Mn thin films produced by ALE and to simplify the manufacturing process of such thin films.

These and other objects, together with the advantages thereof over known methods and processes, which shall become apparent from the specification which follows, are accomplished by the invention as hereinafter described and claimed.

The present invention is based on using a organozinc compounds as volatile zinc compounds and organomanganese compounds or organic manganese complex compounds as manganese compounds in the ALE process.

Deposition of ZnS:Mn thin films from an organic manganese complex compound used as precursor by ALE is known in the art. For instance, under laboratory conditions, ZnS:Mn thin films have been grown using zinc oxyacetate, tris(2,2,6,6-tetramethyl-3,5-heptanedionato)manganese(III) [Mn(thd)$_3$] and hydrogen sulfide (M. Tammenmaa, T. Koskinen, L. Hiltunen, M. Leskelä and L. Niinistö: Growth of ZnS Films Using Zinc Acetate as Zinc Source and Manganese and Lanthanoid β-diketonates as Activator Sources, First Symposium on Atomic Layer Epitaxy, p. 18, VTT, Espoo, Finland, 1984). While thin films have been prepared using the method described in cited publication, no actual EL thin-film structures are discussed in the publication. It has turned out that the light output of thin films made according to the publication by Tammenmaa et al. remains rather low and, moreover, light emission at different polarities of the driving voltage is asymmetrical.

Growth of undoped zinc sulfide (and zinc selenide) layers from dimethylzinc or diethylzinc and hydrogen sulfide (hydrogen selenide) using the ALE method is discussed in a number of publications [cf., e.g., A. Yoshikawa, T. Okamoto, H. Yasuda, S. Yamaga and H. Kansai: "MBE-like" and "CVD-like" Atomic Layer Epitaxy of ZnSe in MOMBE System. Journal of Cryst. Growth, Vol. 101 (1990), p. 86; Y. Wu, T. Toyoda, Y. Kawakami, Sz. Fujita and Sg. Fujita: Atomic Layer Epitaxy of ZnS on GaAs Substrates by Metalorganic Molecular Beam Epitaxy, Japan. Journal of Appl. Phys., Vol. 29 (1990), p. L727; N. Shibata and A. Katsui: Monolayer Epitaxy of ZnSe on GaAs Substrates by Alternating Adsorption of Diethylzinc and Hydrogenselenide, Journal of Cryst. Growth, Vol. 101 (1990), p. 91; I. Bhat and S. Akram: Atomic Layer Epitaxial Growth of ZnSe Using Dimethylzinc and Hydrogen Selenide, Journal of Cryst. Growth, Vol. 138, p. 127 (1994)]. These techniques are not used for making ZnS:Mn thin films, not to speak of ZnS:Mn-based EL thin-film structures.

Unexpectedly, it has now been found that when manganese-doped zinc sulfide phosphor layers are grown by ALE for thin-film electroluminescent components, a particularly advantageous structure is obtained if the zinc chloride, or alternatively, the zinc oxyacetate mentioned in the publication by Tammenmaa et al., which is conventionally used as precursor for zinc, is replaced by an organozinc compound.

Further, according to the present invention, hydrogen sulfide or an organosulfur compound is used as precursor for sulfur, and an organic manganese compound or organic manganese complex compound is used as precursor for manganese.

In summary, the present invention comprises the steps of using an organozinc compound as precursor for zinc, hydrogen sulfide or an organosulfur compound as precursor for sulfur, and an organomanganese compound or organic manganese complex compound as precursor for manganese.

DETAILED DESCRIPTION OF THE INVENTION

The present invention discloses a method of growing electroluminescent ZnS:Mn thin films. The specifications of the novel process are outlined as follows:

1. The growth of the ZnS:Mn thin film is implemented using the ALE method, that is, using a pulsed infeed of the anion and cation pecursors in an alternating sequence so as to prevent the surface of the substrate located in the reaction space from becoming simultaneously exposed to both precursors. The thin-film growth process comprises a growth step of a zinc sulfide layer followed by a manganese-doping step, whereby both steps are repeated in an alternating sequence until the desired layer thickness is attained. For details of the ALE method, reference is made to U.S. Pat. Nos. 4,058,430 and 4,389,973.

2. The temperature of the growth process is controlled to be so high as to prevent the precursor from condensing on the substrate surface, yet keeping the temperature sufficiently low to avoid thermal decomposition of the reagent in an essential amount on the substrate surface. Depending on the precursors, the substrate surface temperature is typically 300° C. to 400° C.

3. An organozinc compound, is used as precursor for zinc, and hydrogen sulfide or an organosulfur compound, such as mercaptans, is used as precursor for sulfur. In particular, the precursor for zinc is herein a simple zinc alkyl compound. In the prior art, diethylzinc has been used in the MOCVD method for the preparation of ZnS films of good crystallinity [cf. Migata, M., Kanehisa, O., Shiiki, M. and Yamamoto, H.: The Preparation of ZnS:Mn Electroluminescent Layers by MOCVD Using New Manganese Sources, J. Crystal Growth 93 (1988), pp. 686–691]. In conjunction with the present invention it has unexpectedly been found that organozinc compounds can be used in the ALE method for preparing thin-film structures of extremely advantageous aging properties and drive-voltage-symmetrical light emission. No mention can be found in the publication by Migata et al. that such characteristics could be attained in the MOCVD method by using diethylzinc as precursor.

4. The precursor for manganese is selected from the group of organic manganese compounds or organic manganese complex compounds which will not condense or undergo essential thermal decomposition on the substrate surface, but instead, can form a layer, typically not thicker than a molecular layer, on the substrate surface. When the sulfur precursor is introduced in the next step, the adsorbed molecules react therewith leaving only manganese and sulfur atoms on the substrate surface, but no impurity atoms (at least no significant amount of impurity atoms). Suitable precursors are, e.g., $Mn(thd)_3$ and bis(cyclopentadienyl) manganese $Mn(cpd)_2$.

In the context of the present invention, the terms "organoelements" or "organoelemental compounds" or "organic elemental compounds" refer to compounds in which at least one organic group is bonded to said element (Zn, Mn or S) via one or a greater number of carbons or carbon rings. The term "organic manganese complex compounds" refers to compounds in which at least one organic group is bonded to manganese via oxygen, sulfur or nitrogen. Said organic groups have a hydrocarbon group (comprising at least one carbon and one hydrogen, such as alkyl, acyl, aryl+halide and similar derivatives) and further possibly other elements such as halides, chalcogenides or nitrogen bonded thereto. In the present context, also hydrogen or carbon bonded to sulfur is considered to form organic groups.

Organozinc compounds suitable for use as the zinc precursor include dialkyl compounds, e.g., dipentyl zinc $((C_5H_{ })_2Zn)$, diisopropyl zinc $(i-(C_3H_7)_2Zn)$ and tertiary dibutyl zinc $(t-(C_4H_9)_2Zn)$ and other dialkyl compounds having 1–6 carbons in their alkyl carbon chain, and diaryl compounds, e.g., diphenyl zinc $((C_6H_5)_2Zn)$. Particularly suitable herein are the simplest dialkyl compounds such as dimethylzinc $((CH_3)_2Zn)$ and diethylzinc $((C_2H_5)_2Zn)$. Further possible compounds are offered by organozinc compounds having their functional groups bonding other elements (halogens, oxygen, sulfur, nitrogen), such as di-3-mercaptopropyl zinc $((C_3H_7SH)_2Zn)$ and di-4-metoxybutyl zinc $((C_4H_9CHO)_2Zn)$. for instance, or dialkyl compounds forming complex compounds with ethers or amines, such as dimethyl zinc-1,4-dioxane $((CH_3)_2Zn.C_4H_8O_2)$.

Hydrogen sulfide as the sulfur precursor in the process may be replaced with, e.g., carbon disulfide $(CS_2)$ or a dialkyl sulfur compound such as dimethyl sulfur $(S(CH_3)_2)$ and diethyl sulfur $(S(C_2H_5)_2)$, for instance, or with mercaptans such as methyl mercaptan $(HSCH_3)$ and t-butyl mercaptan $(HSC(CH_3)_3)$, for instance, or with sulfur compounds with a ring structure, such as thiophene $(C_4H_4S)$ and propylene sulfide $(CH_2CHCH_3S)$, or with sulfanes, $H_2S_x$, examples of which are dihydrogen disulfide $(H_2S_2)$ and dihydrogen trisulfide $(H_2S_3)$ and precursors thereof, such as the ether complex of trithiocarbonic acid $(H_2CS_3.2(C_2H_5)_2O)$.

As precursor for manganese, organometal compounds of manganese may be used, such as hydrocarbon complexes, e.g., bis(cyclopentadienyl) manganese $Mn(C_5H_5)_2$ [Mn $(cpd)_2$], or alkyl-, aryl-, acyl- or carbonyl-substituted derivatives, e.g., bis(methylcyclopentadienyl) manganese $Mn(C_5H_4CH_3)_2$ (BCPM), or alkyl, aryl, acyl and carbonyl compounds, e.g., tricarbonyl methyl manganese $((CO)_3Mn(CH_3))$, or their composite forms and halide derivatives, e.g., tricarbonyl(methylcyclopentadienyl) manganese $((CH_3C_5H_4)Mn(CO)_3)$ (TCM), bis(pentamethylcyclopentadienyl) manganese $((CH_3)_5C_5)_2Mn$ and manganese pentacarbonyl bromide $(Mn(CO)_5Br)$. Useful alternatives among compounds formed with an oxygen bond are beta-diketonates and their derivatives such as bis(pentane-2,4-dithionato) manganese $(Mn(acac)_2)$, tris(2,2,6,6-tetramethyl-3,5-heptanedionato) manganese $(Mn(thd)_3)$ and among compounds formed with a sulfur bond useful alternatives are carbamates, e.g., manganese dibutyldithio carbamate $(Mn(C_4H_{11})_2NCS_2)$, or xantates such as, e.g., manganese N-butyl xantate $(Mn(C_4H_9OCS_2)_2)$.

As is evident from the above description, according to a preferred embodiment of the invention, the ZnS:Mn phosphor layer is grown on a substrate placed in a reaction space using organozinc compounds, hydrogen sulfide or organosulfur compounds and organic manganese compounds or organic manganese complex compounds as precursors.

By virtue of the present invention, a thin-film electroluminescent component can be prepared, comprising a substrate, an ion-diffusion barrier layer possibly formed on said substrate, a patterned set of first electrodes formed thereon, a first insulation layer formed on said electrode pattern, a ZnS:Mn phosphor layer grown on said insulation layer, a second insulation layer deposited on said phosphor layer, and a patterned set of second electrodes formed on said second insulation layer.

Most appropriately, the substrate of a thin-film electroluminescent component is of glass, $Al_2O_3$ or silicon. The ion-diffusion barrier layer may be made from, e.g., $Al_2O_3$ or an oxide of silicon. Further, the first and second aligned set of electrodes formed on the substrate are made of a conducting material, in which particularly advantageous choices are, e.g., indium-tin oxide, suitably doped zinc oxide, Al, W or Mo. The electrodes are made by depositing and/or patterning a suitable layer on the substrate using conventional techniques. The first insulation layer formed on said electrodes can be made from a metal oxide or composite structure of metal oxides such as an aluminum oxide-titanium oxide multilayer structure. On the first insulation layer is grown the actual phosphor layer, that is, the ZnS:Mn layer using the above-described techniques. On the other side of the phosphor layer is formed a second insulation layer formed on said phosphor layer, which may comprise, e.g. an aluminum oxide-titanium oxide multilayer structure, and on which the set of second electrodes is then formed and patterned.

According to another embodiment of the invention, the above-described basic structure can be modified by growing a second phosphor layer between said ZnS:Mn phosphor layer and the insulation layer deposited under or above said phosphor layer. This second phosphor layer is advantageously formed by an SrS:Ce or ZnS:Mn phosphor layer. Between said ZnS:Mn phosphor layer and the second phosphor layer grown under or above said first phosphor layer may be deposited a second insulation layer if so desired.

The present invention offers significant benefits as compared to both the conventional ALE process for forming electroluminescent ZnS:Mn layers (chloride process) and the use of zinc oxyacetate.

The electroluminescent ZnS:Mn structure according to the invention provides the drive-voltage-symmetrical light emission property which is crucial in the control of gray-scale displays. A comparison of the characteristics plotted for the EL thin-film structure according to the invention prepared in Example 1 and those of the structure prepared according to conventional techniques as exemplified in Examples 1 and 4 makes it evident that the present invention offers a vastly improved and more symmetrical light emission.

The luminance of the display using an electroluminescent ZnS:Mn structure according to the invention degrades at a lower rate and the display exhibits a smaller degree of pattern burning which is due to the lesser rate of luminance degradation of individual pixels during prolonged use.

In the ALE process according to the invention for forming an electroluminescent ZnS:Mn structure, the use of an organic precursor permits the substrate temperature to be kept clearly below the softening point of soda lime glass, whereby economical losses due to warping of the glass substrate are eliminated.

A plurality of organozinc compounds are liquids at room temperature, and their high vapor pressure facilitates direct infeed via a pulsed valve into the reactor without the need for equipping the system with additional cooling, heating or bubbling equipment. As compared to the high-temperature pulsed-valve dosing system required by the use of zinc chloride, this feature is a distinct benefit. Moreover, a liquid precursor is easier to handle than a solid, hygroscopic precursor such as $ZnCl_2$.

A number of the above-mentioned organic manganese compounds or complex compounds such as $Mn(thd)_3$ are solids. While they require the system to be equipped with a high-temperature pulsed-valve dosing system when used in the ALE process, they offer clearly higher vapor pressures at low temperatures in comparison with use of manganese chloride. Some compounds such as TCM are liquids at room temperature, which facilitates their direct pulsing through a pulsed valve.

Next, the invention will be examined in greater detail with the help of the following, non-limiting examples:

EXAMPLES

Example 1

Growth of ZnS:Mn phosphor for TFEL components by ALE using hydrogen sulfide, diethylzinc and $Mn(thd)_3$ as precursors and respectively hydrogen sulfide and chlorides as precursors in a comparative process.

Figure 2:
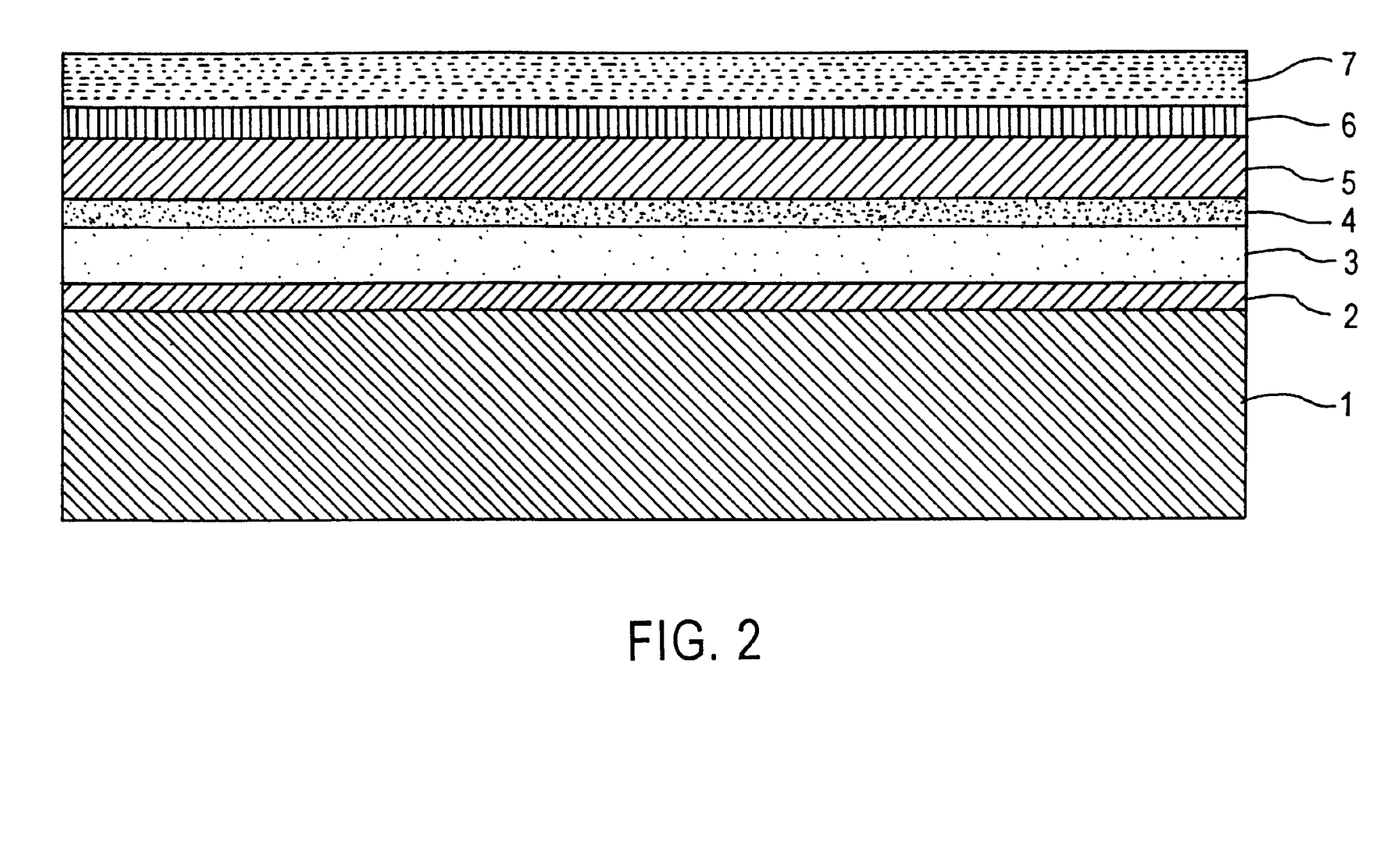
FIG. 2 shows a cross-sectional view of an EL component comprising the superimposed layers from bottom to top: glass/ion-diffusion barrier/ITO/Al$_x$Ti$_y$O$_z$/ZnS:Mn/Al$_x$Ti$_y$O$_z$/Al.

The thin-film structure of the TFEL component prepared in the example is shown in FIG. 2. Referring to the diagram, the phosphor layer of the TFEL component is grown on a soda lime glass substrate 1, on the surface of which is first made an $Al_2O_3$ ion-diffusion barrier layer 2 and an ITO conductor pattern 3. By ALE, on the ITO conductor layer is grown an $Al_xTi_yO_z$ compound oxide insulation layer 4 using aluminum chloride, titanium chloride and water as reagents. A ZnS:Mn phosphor layer 5 is next grown by two different methods: A) using hydrogen sulfide, pulverized zinc chloride and $MnCl_2$ as reagents at 510° C. growth process temperature and B) using hydrogen sulfide, liquid diethylzinc and $Mn(thd)_3$ as reagents at 350° C. growth process temperature. Zinc sulfide is first deposited for N cycles, whereby the surface of the glass substrate is subjected to a train of reagent pulses N×(zinc precursor+hydrogen sulfide), after which the glass substrate surface is subjected to another train of reagent pulses M×(manganese precursor+hydrogen sulfide). The pulse sequences are repeated L times until the desired thickness of the phosphor layer is attained. The reaction chamber pressure is controlled to 1.5 torr. On the phosphor layer is next deposited by ALE an $Al_xTi_yO_z$ insulation layer 6. On the insulation layer is made an Al conductor pattern 7.

When using the chloride-precursor-based method A and setting the process parameters as N=120, M=1 and L=50, a phosphor layer is obtained with a thickness of 730 nm and a dominant wavelength of 582 nm. In a test setup of several components driven by a 60 Hz AC voltage, measured mean luminance was $L_{40}$=440 cd/m² and the luminous efficiency $\eta_{40}$=2.9 lm/W. Luminance and luminous efficiency were recorded using a constant drive voltage, whose value was determined so that, after an initial burn-in aging cycle of 23 h with 600 Hz drive voltage, the turn-on voltage of the component was exceeded by 40 V (=$V_{40}$). Component turn-on voltage is defined as the drive voltage at which the phosphor luminance is 1 cd/M².

Figure 1A:
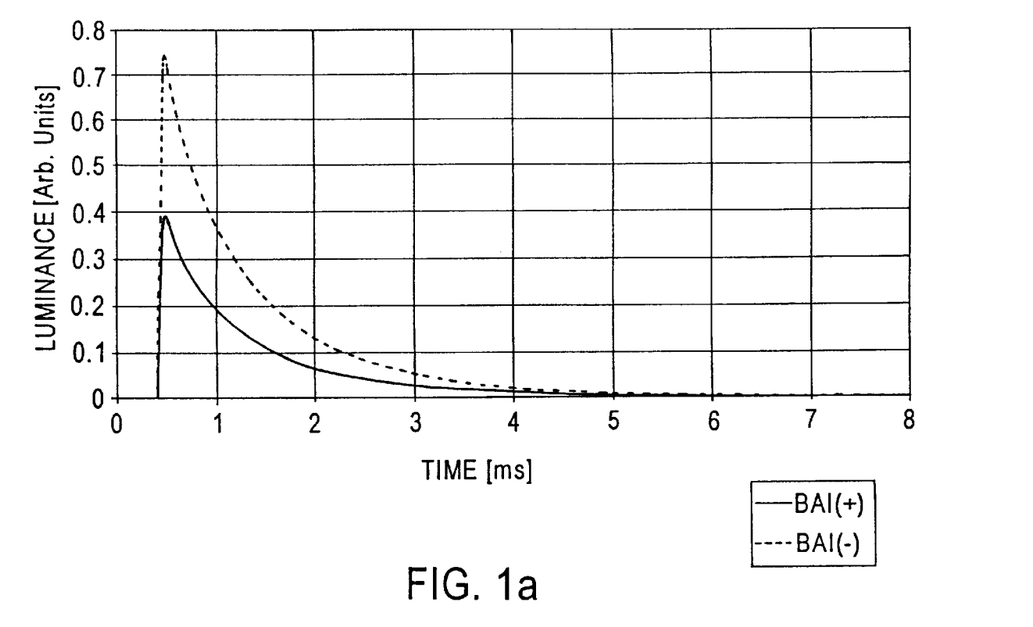
FIG. 1a shows a plot of luminance vs. time for both drive voltage polarities of a ZnS:Mn multilayer structure grown according to conventional techniques using hydrogen sulfide zinc chloride and manganese chloride as precursors: the upper luminance curve corresponds to the positive drive voltage polarity of the Al electrode and lower curve the negative drive voltage polarity of the Al electrode.
Figure 3A:
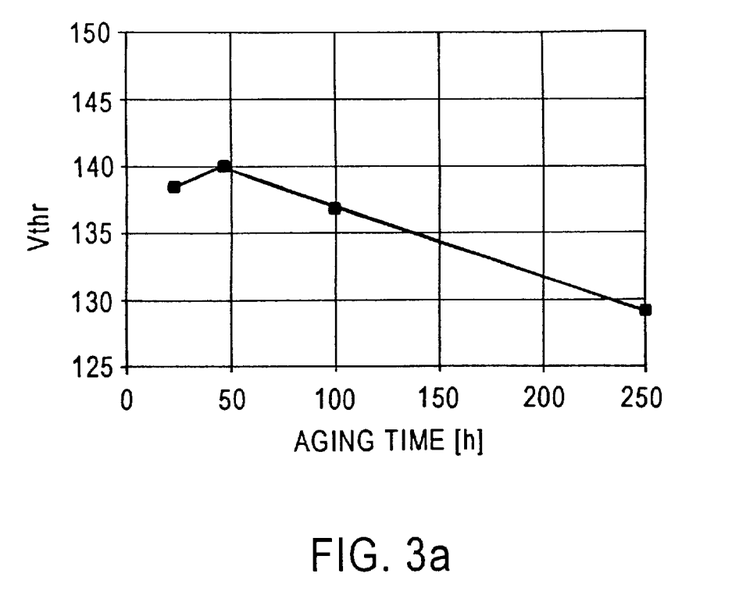
FIG. 3a shows a plot of turn-on drive voltage drift during component aging when the ZnS:Mn multilayer structure is grown according to the conventional technique using hydrogen sulfide, zinc chloride and manganese chloride as precursors.
Figure 4A:
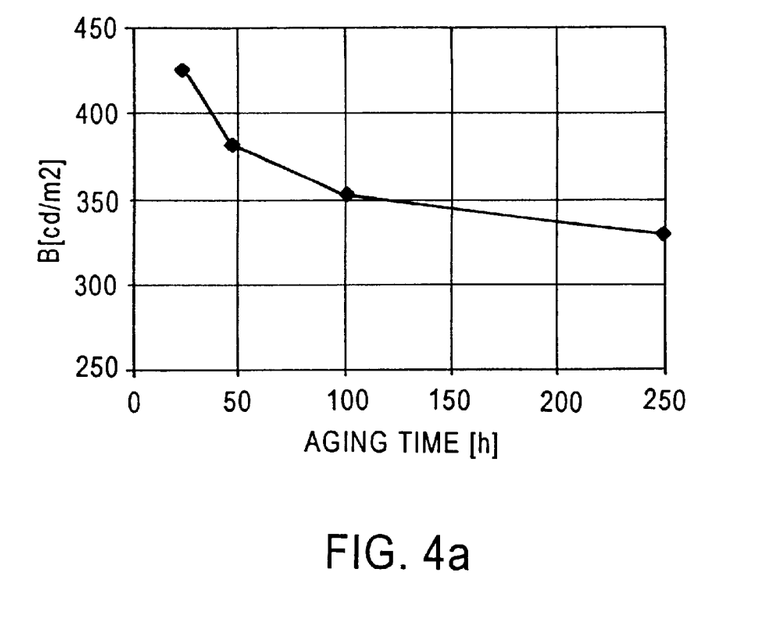
FIG. 4a shows a plot of luminance degradation during component aging when the ZnS:Mn multilayer structure is grown according to the conventional technique using hydrogen sulfide, zinc chloride and manganese chloride as precursors.

FIG. 1a shows the drive-voltage-dependent symmetry of the light emission of the component, FIG. 3a is a plot of the turn-on voltage drift during aging and FIG. 4a shows the degradation of the luminance level $L_{40}$ during aging. Aging was performed using a 600 Hz drive voltage and the luminance level $L_{40}$ was measured at a constant drive voltage $V_{40}$ determined during the first aging cycle (refer to text above).

Figure 1B:
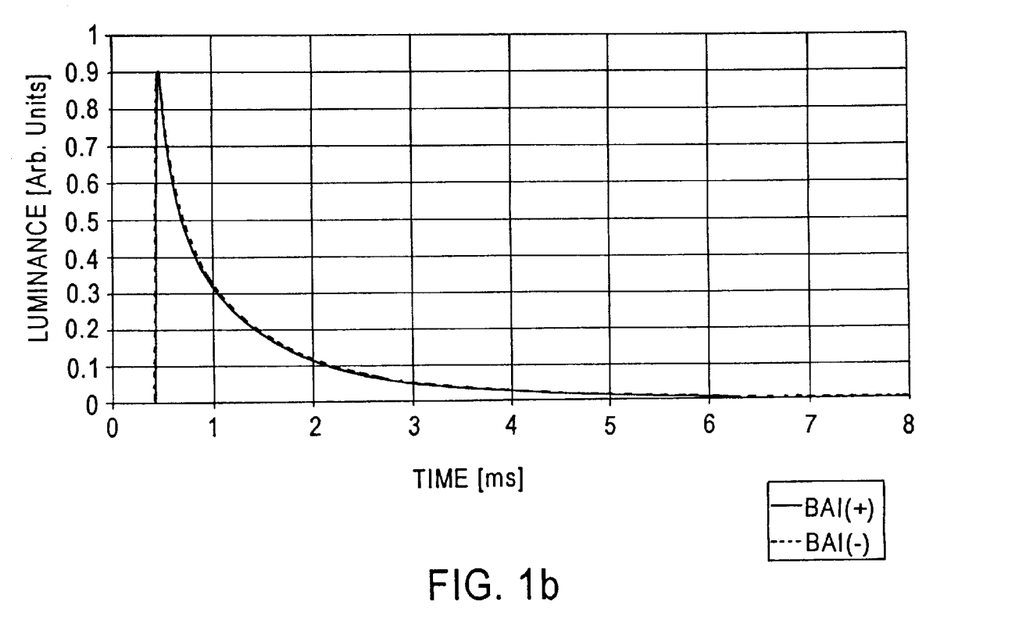
FIG. 1b shows a plot of luminance vs. time for both drive voltage polarities of a ZnS:Mn multilayer structure grown using hydrogen sulfide, diethylzinc and Mn(thd)$_3$ as precursors: one luminance curve corresponds to the positive drive voltage polarity of the Al electrode and the other curve to the negative drive voltage polarity of the Al electrode, both curves being entirely coincident with each other.
Figure 3B:
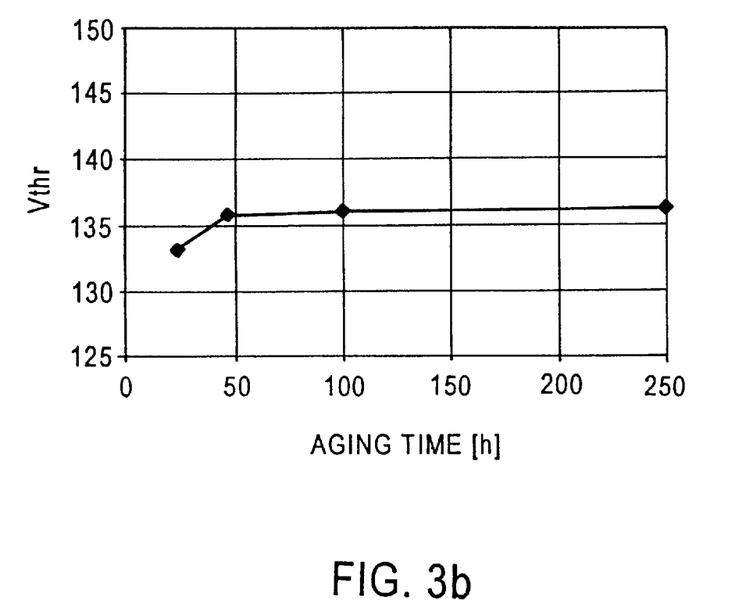
FIG. 3b shows a plot of turn-on drive voltage drift during component aging when the ZnS:Mn structure is grown using hydrogen sulfide, diethylzinc and Mn(thd)$_3$ as precursors.
Figure 4B:
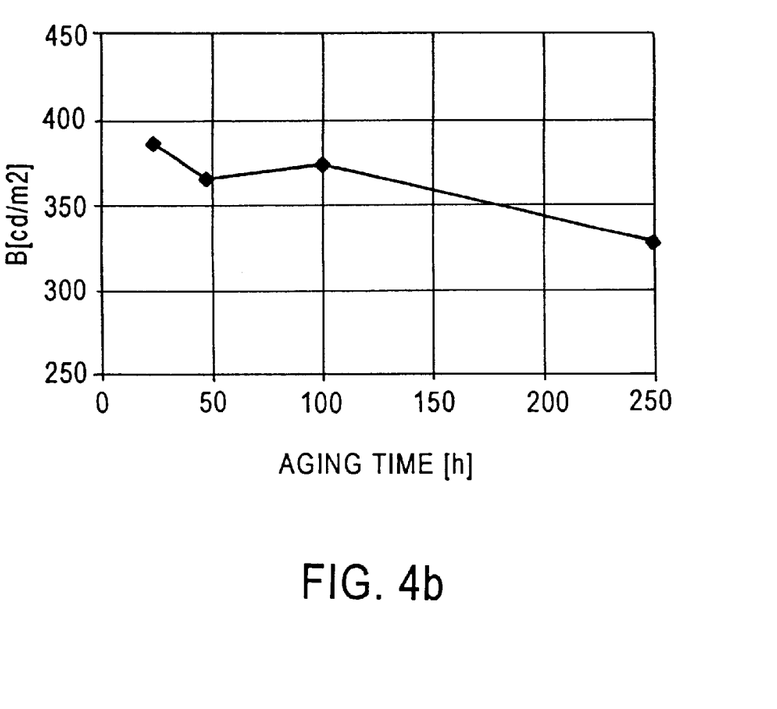
FIG. 4b shows a plot of luminance degradation during component aging when the ZnS:Mn structure is grown using hydrogen sulfide, diethylzinc and Mn(thd)$_3$ as precursors.

When using method B according to the invention and setting the process parameters as N=100, M=1 and L=177, a phosphor layer is obtained with a thickness of 770 nm and a dominant wavelength of 584 nm. Subjected to similar aging and measurement as described above, the components exhibited a mean luminance of $L_{40}$=430 cd/m² and a luminous efficiency $\eta_{40}$=2.9 lm/W. FIG. 1b shows the drive-voltage-dependent symmetry of the light emission of the component, FIG. 3b is a plot of the turn-on voltage drift during aging and FIG. 4b shows the degradation of the luminance level $L_{40}$ during aging.

This example proves that the ZnS:Mn process according to one embodiment of the invention gives improved component performance over that resulting from the use of a chloride-precursor-based conventional process: light output is symmetrical with respect to drive voltage polarity and the luminance level and turn-on voltage of the component exhibit higher stability.

Example 2

Growth of ZnS:Mn phosphor for TFEL components by ALE using hydrogen sulfide, diethylzinc and bis (cyclopentadienyl) manganese $Mn(cpd)_2$ as precursors.

In this process, the phosphor layer of a TFEL component is grown on a soda lime glass substrate having its surface covered with an $Al_2O_3$ ion-diffusion barrier layer and an ITO conductor pattern. On the ITO conductor pattern is grown by ALE an $Al_xTi_yO_z$ compound oxide insulation layer in the same manner as described in Example 1 above using aluminum chloride, titanium chloride and water as reagents. The zinc sulfide matrix of the phosphor layer is grown at 350° C. substrate surface temperature using liquid diethylzinc and hydrogen sulfide as precursors. Doping with manganese is accomplished by sequentially pulsed infeed of $Mn(cpd)_2$ and hydrogen sulfide. Zinc sulfide is deposited for 100 cycles, whereby the surface of the glass substrate is subjected to a train of reagent pulses 100×(diethylzinc+hydrogen sulfide), after which the glass substrate surface is subjected to another train of reagent pulses 1×($Mn(cpd)_2$+hydrogen sulfide). The pulse sequences are repeated 122 times until the desired thickness of the phosphor layer is attained. On the phosphor layer is next deposited by ALE a similar $Al_xTi_yO_z$ insulation layer as in Example 1. On the insulation layer is made an Al conductor pattern. The multilayer structure of the TFEL component thus obtained is shown in FIG. 2.

When using the above-described method, a phosphor layer is obtained with a thickness of 530 nm and a dominant wavelength of 580 nm. In a test setup driving the prepared component with a 60 Hz AC voltage, measured luminance was $L_{40}$=250 cd/M² and luminous efficiency $\eta_{40}$=2.3 lm/W. Luminance and luminous efficiency were recorded using a constant drive voltage, whose value ($V_{40}$) was set 40 V above the component turn-on voltage measured after an initial burn-in aging cycle of 7 h with 1 kHz drive voltage. Component turn-on voltage is defined as the drive voltage at which the phosphor luminance is 1 cd/m². When the component was aged in the manner as in Example 1, the turn-on voltage changed less than 2 V from the level measured at the end of the initial 7 h aging cycle to the end of the 250 h aging cycle and the measured luminance $L_{40}$ decreased by 13%. Light output remained as symmetrical as shown in FIG. 1.

When the test result is compared to equivalent EL components having the insulation and phosphor layers, respectively, made as thick as in this example, it can be seen that the method described in this example achieves with the limits of realizable measurement deviation the same $L_{40}$ and $\eta_{40}$ values as methods A and B of Example 1. During aging, the turn-on voltage changed in the components made by the method of this example much less (about 10 V) than in components made by the methods of Example 1. Luminance degraded by the same amount (13%) in components made by the method of this example and method B of Example 1, while components made by method A of Example 1 exhibited faster luminance degradation (23%).

This example proves that also the ZnS:Mn process according to another embodiment of the invention gives improved component performance over that resulting from the use a chloride-precursor-based process: light output is symmetrical with respect to drive voltage polarity and the luminance level of the display component exhibits higher stability.

Example 3

Growth of ZnS:Mn phosphor for TFEL components by ALE using t-butylmercaptan, dimethylzinc and bis (methylcyclopentadienyl) manganese (BCPM) as precursors.

In this process, the phosphor layer of a TFEL component is grown on a soda lime glass substrate having its surface covered with an $Al_2O_3$ ion-diffusion barrier layer and an ITO conductor pattern. On the ITO conductor pattern is grown by ALE an $Al_xTi_yO_z$ compound oxide insulation layer in the same manner as described in Examples 1 and 2 above using aluminum chloride, titanium chloride and water as reagents. The zinc sulfide matrix of the phosphor layer is grown at 300° C. substrate temperature using liquid dimethylzinc and t-butyl mercaptan as precursors. Doping with manganese is accomplished by sequentially pulsed infeed of bis (methylcyclopentadienyl) manganese and hydrogen sulfide. Zinc sulfide is deposited for 100 cycles, whereby the surface of the glass substrate is subjected to a train of reagent pulses 100×(dimethylzinc+t-butyl mercaptan), after which the glass substrate surface is subjected to another train of reagent pulses 2×(BCPM+t-butylmercaptan or hydrogen sulfide). The pulse sequences are repeated 150 times until the desired thickness of the phosphor layer is attained. On the phosphor layer is next deposited by ALE a similar $Al_xTi_yO_z$ insulation layer as in Examples 1 and 2. On the insulation layer is made an Al conductor pattern. The multilayer structure of the TFEL component thus obtained is shown in FIG. 2.

Example 4

Growth of ZnS:Mn phosphor for TFEL components by ALE using hydrogen sulfide, zinc oxyacetate and Mn(thd)$_3$ as precursors.

In this process, the phosphor layer of a TFEL component is grown on a soda lime glass substrate having its surface covered with an $Al_2O_3$ ion-diffusion barrier layer and an ITO conductor pattern. On the ITO conductor pattern is grown by ALE an $Al_xTi_yO_z$ compound oxide insulation layer in the same manner as described in Examples 1–3 above using aluminum chloride, titanium chloride and water as reagents. The zinc sulfide matrix of the phosphor layer is grown using pulverized, crystalline zinc oxyacetate (Zn$_4$OAc$_6$) and hydrogen sulfide as precursors. Doping with manganese is accomplished by sequentially pulsed infeed of Mn(thd)$_3$ and hydrogen sulfide. Zinc sulfide is deposited for N cycles, whereby the surface of the glass substrate is subjected to a train of reagent pulses N×(zinc oxyacetate+hydrogen sulfide), after which the glass substrate surface is subjected to another train of reagent pulses M×(Mn(thd)$_3$+hydrogen sulfide). The pulse sequences are repeated L times until the desired thickness of the phosphor layer is attained. On the phosphor layer is next deposited by ALE a similar $Al_xTi_yO_z$ insulation layer as in Examples 1–3. On the insulation layer is made an Al conductor pattern. The multilayer structure of the TFEL component thus obtained is shown in FIG. 2.

When using the above-described method at a substrate temperature of 350° C. under a reaction chamber pressure of 1.5 torr and setting the process parameters as N=15, M=1 and L=100, a phosphor layer is obtained with a thickness of 480 nm and a dominant wavelength of 580 nm. The luminance of the layer remains clearly inferior to that of the components made using the deposition methods of Examples 1 and 2. When using a similar test setup as in Examples 1 and 2, the measured maximum luminance was $L_{40}$=100 cd/m$^2$ and luminous efficiency $\eta_{40}$=0.8 lm/W. The light output pulses were substantially asymmetrical (35–45% at Al+, 55–65% at Al−) as compared to the results obtained in Examples 1B and 2 using the precursors according to the present invention.

This example proves that the exceptionally advantageous characteristics of the phosphor layer according to the invention cannot be attained by means of a conventional ZnS:Mn growth process using hydrogen sulfide, zinc oxyacetate and Mn(thd)$_3$ as precursors.

Example 5

Growth of ZnS:Mn phosphor for TFEL components by ALE using hydrogen sulfide, zinc chloride and Mn(thd)$_3$ as precursors.

In this process, the phosphor layer of a TFEL component is grown on a soda lime glass substrate having its surface covered with an $Al_2O_3$ ion-diffusion barrier layer and an ITO conductor pattern. On the ITO conductor pattern is grown by ALE an $Al_xTi_yO_z$ compound oxide insulation layer in the same manner as described in Examples 1–4 above using aluminum chloride, titanium chloride and water as reagents. The zinc sulfide matrix of the phosphor layer is grown in the same manner as in Example 1 using pulverized, crystalline zinc chloride and hydrogen sulfide as precursors. Doping with manganese is accomplished by sequentially pulsed infeed of Mn(thd)$_3$ and hydrogen sulfide. Zinc sulfide is deposited for N cycles, whereby the surface of the glass substrate is subjected to a train of reagent pulses N×(zinc chloride+hydrogen sulfide), after which the glass substrate surface is subjected to another train of reagent pulses M×(Mn(thd)$_3$+hydrogen sulfide). The pulse sequences are repeated L times until the desired thickness of the phosphor layer is attained. On the phosphor layer is next deposited by ALE a similar $Al_xTi_yO_z$ insulation layer as in Examples 1–4. On the insulation layer is made an Al conductor pattern. The multilayer structure of the TFEL component thus obtained is shown in FIG. 2.

When using the above-described method at a substrate surface temperature of 450° C. under a reaction chamber pressure of 1.5 torr and setting the process parameters as N=120, M=10 and L=29, a phosphor layer is obtained with a thickness of 450 nm and a dominant wavelength of 580 nm. The luminance of the layer remains clearly inferior to that of the components made using the deposition methods of Examples 1 and 2. When using a similar test setup, the measured maximum luminance was here $L_{40}$=75 cd/m$^2$ This example proves that the exceptionally advantageous characteristics of the phosphor layer according to the invention cannot be attained by means of a conventional zinc-chloride-type ZnS layer growth process in which $MnCl_2$ as a precursor is replaced by $Mn(thd)_3$.

What is claimed is:

1. A method of growing a ZnS:Mn phosphor layer for use in thin-film electroluminescent components, comprising growing the ZnS:Mn phosphor layer on a substrate by an atomic layer epitaxy method using an organozinc compound as a precursor for zinc selected from the group consisting of simple alkyl compounds, $C_1$–$C_6$ dialkyl compounds, diaryl compounds, di-3-mercaptopropyl zinc, di-4-metoxybutyl zinc and dialkyl zinc compounds forming complex compounds with ethers or amines, hydrogen sulfide or an organosulfur compound as a precursor for sulfur, and an organomanganese compound or organic manganese complex compound as a precursor for manganese.

2. The method according to claim 1, wherein a simple alkyl compound is used as precursor for zinc.

3. The method according to claim 2, wherein the alkyl compound is selected from the group of diethylzinc and dimethylzinc.

4. The method according to claim 2, wherein the precursor for manganese is selected from the group of $Mn(thd)_3$, TCM, $Mn(cpd)_3$ and BCPM.

5. The method according to claim 1, wherein a thin-film electroluminescent component is prepared, comprising the steps of:

providing a substrate, optionally forming an ion-diffusion layer on said substrate, forming and patterning a set of first electrodes on said ion-diffusion barrier layer or on said substrate, forming a first insulation layer on said electrodes, growing said ZnS:Mn phosphor layer on said first insulation layer, forming a second insulation layer on said phosphor layer, and forming and patterning a set of second electrodes on said second insulation layer.

6. The method according to claim 5, wherein the substrate being made from a material selected from the group of glass, $Al_2O_3$ and silicon.

7. The method according to claim 5, wherein said first electrodes are made from a material selected from the group of indium-tin oxide, doped zinc oxide, Al, W and Mo.

8. The method according to claim 5, wherein said first insulation layer is formed by an aluminum oxide-titanium oxide multilayer structure.

9. The method according to claim 5, wherein said second insulation layer is formed by an aluminum oxide-titanium oxide multilayer structure.

10. The method according to claim 5, wherein said second electrodes are made from a material selected from the group of indium-tin oxide, doped zinc oxide and Al.

11. The method according to claim 5, wherein a second phosphor layer is grown between said ZnS:Mn phosphor layer and said insulation layer deposited under or above said phosphor layer.

12. The method according to claim 11, wherein said second phosphor layer is selected from the group of SrS:Ce and ZnS:Mn layers.

13. The method according to claim 5, wherein a second insulation layer is grown between said ZnS:Mn phosphor layer and said second phosphor layer deposited under or above said first phosphor layer.

14. The method according to claim 12, wherein said second phosphor layer is selected from the group of SrS:Ce and ZnS:Mn layers.

15. A method of forming a thin-film electroluminescent display, the method comprising the step of:

growing by an atomic layer epitaxy method a manganese-doped zinc sulfide (ZnS:Mn) phosphor layer using an organozinc compound as a zinc precursor selected from the group consisting of simple alkyl compounds, $C_1$–$C_6$ dialkyl compounds diaryl compounds, di-3-mercaptopropyl zinc, di-4-metoxybutyl zinc, and dialkyl zinc compounds forming complex compounds with ethers or amines, a sulfur-containing compound as a sulfur precursor, and an organomanganese compound or an organic manganese complex as a manganese precursor.

16. The method of claim 15, wherein the simple alkyl compound is diethylzinc and dimethylzinc.

17. The method of claim 15, wherein the sulfur-containing compound is selected from the group consisting of hydrogen sulfide, carbon disulfide, dialkyl sulfur compounds, mercaptans, sulfur compounds with a ring structure, and sulfanes.

18. The method of claim 15, further comprising the steps of:

forming an ion-diffusion barrier layer on a substrate;

forming and/or patterning a layer comprising a conducting material;

forming an insulation layer;

forming the ZnS:Mn layer; and and forming a second insulation layer.

19. The method of claim 18, further comprising the step of:

forming and/or patterning a layer comprising a conducting material on the second insulation layer.

20. The method of claim 19, further comprising the step of:

forming a further ZnS:Mn layer between the ZnS:Mn layer and the insulation layer or the second insulation layer; and forming a further insulation layer between the ZnS:Mn layers.

* * * * *